Dec. 7, 1948.  H. E. WEBBER  2,455,394
ACCELEROMETER
Filed June 29, 1943
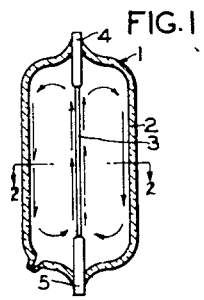
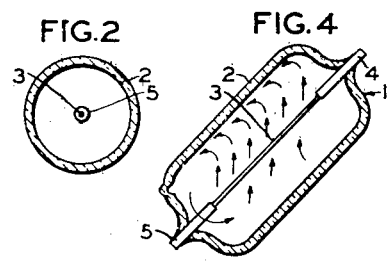
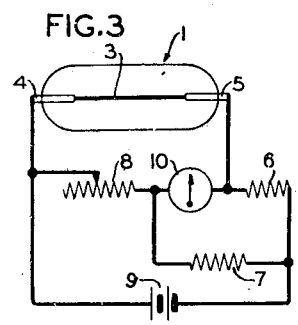
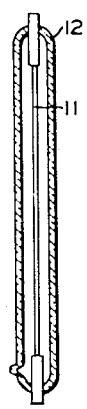
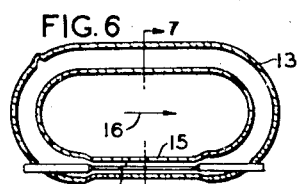
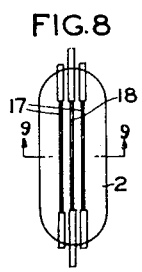
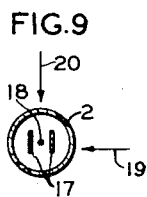
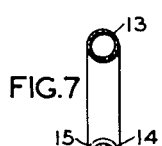
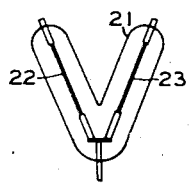
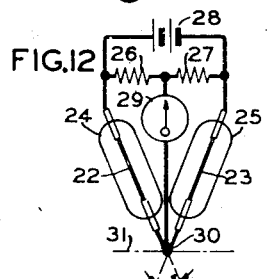
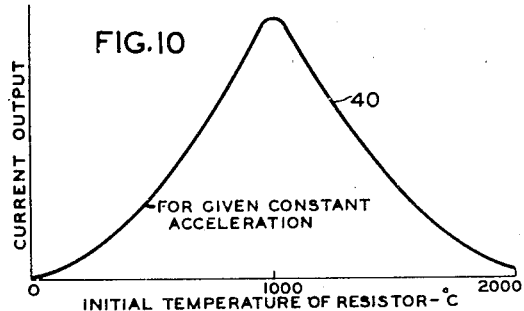
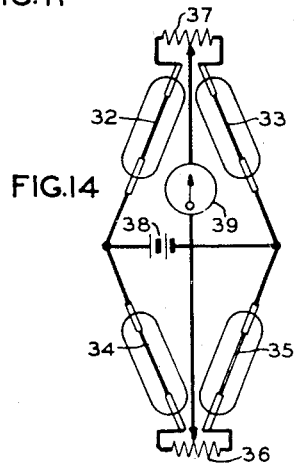
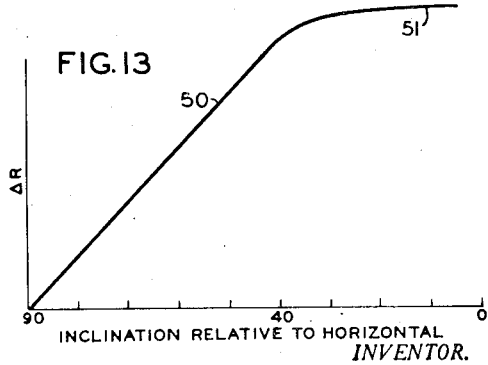
INVENTOR.
HUGH E. WEBBER
BY
Herbert H. Thompson
HIS ATTORNEY.

Patented Dec. 7, 1948

2,455,394

UNITED STATES PATENT OFFICE 2,455,394

ACCELEROMETER

Hugh E. Webber, Williston Park, N. Y., assignor to The Sperry Corporation, a corporation of Delaware Application June 29, 1943, Serial No. 492,771

16 Claims. (Cl. 201—63)

My invention more particularly relates to a device which is sensitive to acceleration forces which may be due to gravity or other causes and which is therefore adapted for use as an inclinometer or accelerometer.

It is a primary object of my invention to provide an accelerometer or tilt indicator comprising a novel acceleration-sensitive element.

Another object of my invention resides in providing an accelerometer comprising an envelope containing a fluid having inertia-exhibiting properties when subjected to acceleration forces, and means for producing a thermal convective stream in said fluid and for determining a change occurring therein whereby a change in the output or indication afforded by said accelerometer is dependent upon a change in the flow of said convective stream relative to a reference axis.

Another object resides in providing an acceleration-sensitive element which comprises an envelope, a resistance element having a high temperature coefficient of resistivity therein and containing a fluid characterized by its property of exhibiting sufficient inertia when subjected to acceleration forces as appreciably to vary the convective flow of the fluid, thereby changing the temperature of the resistance and producing a change in the resistance thereof.

Still other objects reside in providing acceleration-sensitive elements of the character above described, in which the envelope contains a fluid, preferably a gas; and also in which the envelope is closed and contains a fluid.

Another object resides in the provision of an acceleration-sensitive element which is so constructed and arranged that its response to acceleration forces occurring in horizontal planes is suppressed, thereby rendering it primarily responsive to gravity.

Another object lies in providing a device of the foregoing character which will provide an indication of its degree of tilt with respect to the vertical.

Still another object lies in providing an inclinometer which will indicate both the magnitude and direction of tilt thereof about one horizontal axis, but which is insensitive to tilt about a horizontal axis normal to the first axis.

It is a still further object of my invention to provide an accelerometer comprising a balanced or bridge circuit which includes a plurality of acceleration-sensitive elements of the characters above set forth which may be employed as a very sensitive tilt detector or inclinometer.

With the foregoing and other objects in view, my invention includes the novel elements and the combinations and arrangements thereof described below and illustrated in the accompanying drawings in which:

Fig. 1 is a sectional elevation view taken through one form of acceleration-sensitive element of my invention;

Fig. 2 is a sectional plane view thereof taken in about the plane 2—2 of Fig. 1;

Fig. 3 represents the accelerometer of my invention comprising a bridge circuit which includes the element of Fig. 1 in one arm thereof;

Fig. 4 is a view similar to Fig. 1, but which schematically represents the relationship of the resistance element and thermal convection currents when the device is tilted with the resistor at an angle to the vertical;

Fig. 5 is a sectional elevation view through a modified form of an acceleration-sensitive element;

Fig. 6 is a sectional view through a still further modified form of element;

Fig. 7 is a sectional view of the element of Fig. 6, taken at about the plane 7—7 thereof;

Fig. 8 is an elevation view of another modification;

Fig. 9 is a sectional view taken in about the plane 9—9 of Fig. 8;

Fig. 10 is a characteristic curve showing the manner in which the output of a bridge circuit embodying my acceleration-sensitive element such as the arrangement shown in Fig. 3 will vary with the operating temperature of the resistance element under constant conditions;

Fig. 11 is an elevation view of a still further modified form of acceleration-sensitive element which is primarily adapted for use in indicating tilt;

Fig. 12 schematically illustrates the element of Fig. 11 operatively connected in a bridge circuit;

Fig. 13 is a characteristic curve illustrating change in resistance of the resistance element with respect to inclination thereof relative to a horizontal plane; and Fig. 14 schematically illustrates a modified form of tilt detector or inclinometer.

Briefly, in accordance with my invention, I provide a preferably closed envelope, containing a fluid, and means for producing a thermal convective stream in said fluid. When the envelope is stationary or moving at a constant velocity, gravitational forces alone produce a vertically rising convective stream in the fluid which will change in position relative to some reference axis such as an axis of the envelope or the convection stream-producing means when the envelope is tilted relative to the vertical. When subjected to accelerations or acceleration forces other than that solely due to gravity, the convective stream will change in magnitude and direction according to the vector sum of said accelerations relative to an axis of reference. The physical properties of the fluid and the heat supplied determine the convection rate and whether the flow is laminar or turbulent.

In the preferred form of my invention, I employ a means for producing a thermal convective flow or stream in a fluid, which means itself will experience a change in an electrical characteristic thereof, such as resistance in the embodiment herein shown, when a change in the convective stream relative thereto occurs; and detect or measure such change in electrical characteristic as a determination either of magnitude or direction or magnitude and direction relative to some frame of reference of an acceleration force to which the device may be subjected. However, means in addition to the means for producing the thermal convective stream may be used for detecting variations or changes in said stream from a steady state condition wherein said stream is uninfluenced by acceleration forces other than gravity.

Referring first to Figs. 1 through 4 wherein I have illustrated a preferred form of my invention, I indicates generally an acceleration-sensitive element which comprises a closed envelope 2 within which is mounted a resistance element 3 and which contains a fluid. The resistance element 3 is preferably formed of a metal or alloy having a high temperature coefficient of resistivity such as tungsten. However, other metals may be used, such, for example, as platinum which, if desired, may be drawn into extremely fine wire of the order of 0.00005 inch in diameter, thereby forming a desirable resistance element for the accelerometer of this invention.

In the embodiment illustrated, the resistance element 3 is fastened at opposite ends thereof to terminal supports 4 and 5 which serve securely to hold the resistance element 3 preferably against movement relative to the envelope. At the same time the terminal supports function as electrical conductors to the resistance element. As shown, the resistance element 3 is of substantial length, preferably extending in a linear manner, substantially straight and lengthwise of the envelope 1, and is also preferably of relatively small diameter or area in cross-section. With this arrangement, the resistance element throughout its length will bear but one angle of relationship to a given acceleration or a resultant acceleration to which it may be subjected. Furthermore, due to its relatively small cross-sectional size, it will have a comparatively small time constant or short period of initial reaction to acceleration forces, and the change in its resistance or the output of the accelerometer in which it is embodied will be comparatively large. In other words, the smaller the cross-sectional area of the resistance element, the greater the bridge output associated therewith and the shorter the time period of response thereof to acceleration forces.

In practice, I may employ a spring tension mounting for the resistance element to maintain it straight under substantially all conditions. Furthermore, I may use a slightly bowed wire or resistance element or helical or otherwise shaped wires. In other words, the resistance element may be so designed in configuration as to respond to the convection stream in manners to provide accelerometer outputs approximating desired characteristic output curves for given accelerations or through ranges of inclination thereof.

For reasons which will be apparent as the description proceeds, the fluid which is contained in the envelope 2, preferably a gas, should be characterized by the following properties in order for it effectively to function as the medium in which the thermal convection current is produced. It should have low specific heat, a high temperature coefficient of expansion, and a molecular weight of such value that, when the envelope is subjected to acceleration forces, the gas or fluid will exhibit sufficient inertia as appreciably to vary the resistance of the resistance element 3. In using a tungsten resistance element, preferably an inert or relatively inert gas or gases are used and, in any event, preferably a gas of high molecular weight and one which will not chemically attack or react chemically with the resistance element 3.

Due to their inert qualities, I prefer to use an element taken from the group of rare gas elements consisting of helium, neon, argon, krypton, and xenon. Nitrogen, being a relatively inert gas, could also be employed where, for example, a tungsten resistance element is used. These rare and inert gases are desirable not only because of their inertness, thereby prolonging the life of the resistance element which would be otherwise foreshortened when operating in the presence of more active gases, but also because of the relatively high molecular weights of some of them, being progressively of greater molecular weights in the order above named, with xenon being heaviest. The approximate molecular weights of these gases are as follows:

| | |
|---|---|
| Helium | 4.0 |
| Neon | 20.2 |
| Argon | 39.9 |
| Krypton | 82.9 |
| Xenon | 130.2 | and the molecular weight of nitrogen is 28.

A gas which may consist of one of the elements above set forth or any combination thereof together, or with other gases, may be used as should be apparent from the following discussion of the apparent operation of my novel acceleration-sensitive element.

Assuming that the resistance element 3 is energized to operate at a temperature of about 1000° C., a favorable working temperature, and that the resistance element extends in a vertical direction as illustrated in Fig. 1, the heat radiated from the resistor will set up convection currents in the gas rising vertically and paralleling the resistance element toward the top of the envelope where they will pass outwardly and then cascade downwardly giving up their heat to the envelope which in turn transmits the heat to the ambient atmosphere. The cascading convection currents cool and thence move inwardly and again rise paralleling the resistance element. Assuming that the envelope is not subjected to any lateral or horizontal accelerations, a steady state of the resistance 3 obtains with the result that when included in a bridge circuit and the bridge is balanced no output is derived therefrom. Under the above assumed conditions, of course, the device and the fluid therein is subject only to accelerations due to gravity which alone produce the above described thermal convective flow or stream. However, if the device is subjected to an acceleration in space, vertically or in a horizontal plane, the resistance of resistance element 3 will change immediately for all practical purposes and by an amount dependent on the magnitude and the direction of the acceleration. When the acceleration ceases, the resistance of the wire will return to its original steady state value.

The degree of response or magnitude of change in resistance of the resistance element will depend upon the direction of the acceleration. For example, disregarding for the moment the position of the resistance 3 relative to space or to the acceleration forces referred to in the following and considering only those acceleration forces, or assuming a position of the resistance 3, providing maximum responsiveness in each case to such acceleration forces, if the acceleration is of small magnitude and in a horizontal plane, the effect of change in resistance of the resistance 3 will be relatively small since the effect will be due to an acceleration force which is the resultant of the acceleration due to gravity and the horizontal acceleration. In other words, the acceleration force to which the device will be subjected will be equal to the square root of the sum of the squares of the horizontal acceleration and the acceleration due to gravity. In the event the device is subjected to vertical accelerations the response of the device or change in the resistance of element 3 will be much larger as compared to horizontal acceleration forces since in this latter event the acceleration force either adds to or subtracts from the acceleration due to gravity.

When the element is subjected to translational or lateral acceleration forces, the fluid or gas, due to its inertia, effects a wiping action on the resistance element, which element moves with the envelope relative to the fluid. As a result, a more rapid cooling of the resistance element takes place with a resultant change in its resistance, the change in resistance being variable with variations in the magnitude and the direction of the accelerating force with respect to the longitudinal axis of the resistance element.

In Fig. 3 I have shown the resistance element or wire of the acceleration-sensitive element I included in one arm of a bridge circuit which also includes the resistors 6 and 7 and the variable resistance 8. The element I and resistance 6 lie in one-half the bridge while resistance 7 and variable resistance 8 lie in the other half, the resistance 8 being variable for the purpose of balancing the circuit. A battery 9 is connected across one diagonal of the bridge while a meter 10 is connected across the other diagonal. Obviously, an alternating source of current may be employed, and an amplifier and suitable indicating or work-performing devices which are connected to the output thereof may be substituted for the meter 10, or, a control device may be substituted for the meter. The accelerometer of Fig. 3 may be balanced for a steady state resistance value of the resistance element 3, and meter 10 will provide an indication indicative of the magnitude of an acceleration in space which the element I may be given.

Following the above set forth explanation of the phenomenon occurring within the envelope 2 of my acceleration-sensitive element, it will be evident that if the resistance element 3 were tilted in any direction relative to the vertical that a change in resistance thereof will occur. Such a condition is schematically represented in Fig. 4 wherein the resistance element 3 is tilted at an appreciable angle to the vertical. In this position thereof, it will be seen that the convection currents rising vertically from the wire do not parallel the resistor or wire as shown in Fig. 1 but form an angle therewith and thereby provide a greater cooling effect and a consequent change in the resistance. The greater the angle which the resistance element makes with respect to the vertical, the greater the angle between the convection currents and the resistance element with a resultant greater cooling effect and consequent change in resistance of the element.

In Fig. 5, I have shown a modified form of acceleration-sensitive element in which a comparatively long resistance element 11 is employed within a comparatively narrow elongated envelope 12. By relatively closely spacing resistor 11 and the side walls of the envelope 12, the response thereof or change in resistance of the element 11 is appreciably suppressed for horizontal accelerations, at least those which in value are less than that of the acceleration due to gravity. Furthermore, by providing a relatively long resistance element, the device is more sensitive to changes in inclination thereof relative to the vertical, the reason for which is apparent from the above description directed to the change in the relation of the convection currents with respect to the resistance element when tilt occurs. The side walls of the envelope 12 may be cylindrical in order to suppress changes in resistance due to accelerations in all horizontal directions.

The degree of suppression of response of the accelerometer provided in the foregoing manner will vary with variations in spacing between the resistance element or wire and the side walls of the envelope or baffles, hereinafter described. A spacing between the resistance wire and an envelope wall or baffle of the order of magnitude of the wire diameter will provide very marked suppressions.

In Figs. 6 and 7 I have shown a still further modified form of element in which the envelope 13 provides a circuitous flow path for the fluid or gas therewithin and the resistance element 14 is mounted within a constricted zone 15 of the envelope as shown. With this construction, when the element is subjected to an acceleration, for example, in the direction of the arrow 16, a much faster flow of gas than otherwise will occur about the resistance element 14 due to the relatively small bore of zone 15 with an attendant greater change in resistance thereof.

In Figs. 8 and 9 I have shown a modification of my invention wherein the response of the device to horizontal accelerations in one direction is suppressed while its sensitivity to horizontal accelerations in a direction substantially at right angles to the first-mentioned direction is substantially unaffected. In this embodiment, the envelope 2 is provided with a pair of baffle plates 17 which lie on opposite sides of the resistance element 18 and preferably in closely spaced relation thereto. With this construction, when an acceleration force in the direction of arrow 19 is applied to the envelope 2 the baffle 17 will, to an appreciable extent, prevent the gas within the tube from moving due to its inertia relative to the resistance element 18. However, baffles 17 will not affect the flow of gases relative to the resistance element when accelerations occur in the direction of arrow 20.

When the acceleration-sensitive element of my invention such as that shown in Fig. 1 is employed as a tilt detector, the output of the bridge with which it is connected will indicate the magnitude of any deviation thereof from vertical but will provide no indication as to the direction of tilt. Therefore, as illustrated in Fig. 11, I employ a pair of resistance elements which are angularly disposed with respect to each other in forming my inclinometer. In this embodiment of my invention, the envelope 21 is shown generally V-shaped although such shape is not essential. In each branch of the tube is mounted a resistance element 22 and 23, respectively, suitably supported against movement relative to the tube and provided with terminals by means of which the two resistance elements may be connected in separate arms of a bridge or balancing circuit.

The change in resistance of a single straight resistance element such as the element 3 of Fig. 1 does not bear a linear relationship to the degree of inclination thereof relative to the vertical or the horizontal throughout 90° of tilt as shown in Fig. 13. The change in resistance per unit of angular tilt will be substantially linear as the resistance element is tilted from the vertical to about a 45° position. Thereafter, the change in resistance increases to a smaller extent per degree of tilt toward the horizontal as clearly shown in Fig. 13 wherein the first portion 50 of the curve is substantially linear while the second portion 51 thereof, indicating change in resistance of the resistance element for positions thereof between a horizontal position and a position 45° relative thereto, are comparatively small. Therefore, I prefer to arrange resistance elements 22 and 23 at a fixed angle of about 45° with respect to each other so that they may operate on the substantially linear portion 50 of the curve.

In Fig. 12, I have schematically illustrated resistance elements 22 and 23 as being embodied in respective envelopes 24 and 25 and connected in opposite halves of a bridge circuit comprising the resistors 26 and 27, battery 28, and meter 29. In a circuit of this character, assuming that the resistance elements 22 and 23 are mounted to pivot about the axis 30, normal to the plane of the paper, and that they bear the same angular relationship to the vertical, the two halves of the bridge will be balanced and the meter, which in this case is preferably a center, null reading instrument, will read zero. However, if tilt occurs about the axis 30 in, for example, a clockwise direction, the resistance of resistor 23 will decrease and that of 22 will increase, thereby providing a reading on meter 29. Both resistance elements contribute additively to unbalance the bridge and the meter needle will swing to one side of the zero calibration. If rotation occurs from the first assumed position in a counter-clockwise direction, the change in resistance of each resistance element will occur in an opposite sense with the result that the needle of the meter will swing to the opposite side of zero. Therefore, the inclinometer or the meter 29 thereof will provide an indication of magnitude and direction of tilt. Furthermore, if the resistance elements 22 and 23 were to tilt about some axis such as indicated by the dot-dash line 31, no change in the bridge balance would occur since both resistance elements 22 and 23 would be inclined to the same degree and hence their resistance changes will be equal.

In Fig. 14, I have shown a somewhat modified circuit for an inclinometer which comprises a balancing or bridge circuit in which four, relatively angularly fixed acceleration-sensitive devices of the character shown in Fig. 1 are employed. For example, the resistance elements 32 and 33 which are angularly disposed with respect to each other in the manner above described are connected in one-half of the bridge circuit while resistance elements 34 and 35 are similarly relatively arranged and connected in the other half of the bridge circuit. In the embodiment shown, each of these resistances is connected in separate envelopes but may be comprised in one or more, and variable resistors 36 and 37 are incorporated in the circuit for balancing purposes. A battery 38 is connected across one diagonal of the bridge and meter 39 of a type similar to meter 29 is connected across the other diagonal of the bridge circuit, being connected on one side between the resistors 32 and 33 and on the other side between the resistors 34 and 35. It will be seen that if the active elements of the bridge of Fig. 14 were to be tilted from an assumed vertical-indicating position, wherein the resistance elements 32, 33, 34, and 35 lie at the same angle to the vertical, and about an axis perpendicular to the plane of the paper, resistances 32 and 35 will increase in resistance assuming counter-clockwise rotation, while resistances 33 and 34 will decrease in resistance. Since the resistances as shown lie in respective arms of the bridge circuit, they will all contribute to provide a greater output from the bridge circuit for each degree of rotation of tilt thereof than the bridge circuit of Fig. 12, assuming, of course, the same degree of amplification or zero amplification and equal potentials thereacross. Hence the circuit of Fig. 14 will be more sensitive than a circuit in which but two acceleration-sensitive elements are employed. Additionally, one pair of resistance elements such as resistors 32 and 33 may be arranged with the bisector of the angle formed therebetween substantially normal to the bisector of the angle formed by resistors 34 and 35, all four resistors lying substantially in one plane and being rotatable in fixed relative angular relation about an axis normal to said plane.

Since a change in the resistance of a resistance element such as element 3 when subjected to an acceleration force of given magnitude will depend upon the operating temperature thereof, I prefer to operate the resistor in a temperature range wherein the greatest degree of resistance change will occur, thereby providing optimum sensitivity of the device. In Fig. 10, the curve 40 is representative of the relationship of the magnitude of the output of accelerometers embodying the acceleration-sensitive elements of my invention with respect to the initial operating temperatures of the resistance element when subjected to a constant acceleration or accelerations equal in magnitude and direction, the initial operating temperature being a variable. Values for the particular curve were obtained when using a 0.0005 inch diameter tungsten wire resistor enclosed in an argon-filled envelope. It will be seen that the greatest resistance changes for a given acceleration occur in about the region of a temperature of 1000° C. and hence an operating temperature of about this order or within a temperature range of about 800–1200° C. is the most desirable for an acceleration-sensitive element of that character.

In practice, I have employed a tungsten resistance wire which is about one centimeter in length and about 0.0005″ in diameter in a cylindrical glass envelope, the resistance wire being connected in a bridge circuit. Using argon under about one atmosphere pressure as the fluid within the envelope, the accelerometer was quite sensitive, providing an appreciable output reading on the meter without any amplification for all ordinary and comparatively small acceleration forces. The sensitivity or the output of the accelerometer will vary with the physical properties of the fluid or gas and the gas pressures employed. For example, if argon gas is employed under a pressure of approximately ¼ atmosphere, an appreciable but relatively small output will take place as compared to that obtained when one atmosphere of pressure is employed. When the pressure is increased, relatively greater outputs are obtained.

As an example of the power required and magnitude of output under accelerations of one embodiment of my invention, assume the use of a tungsten wire or filament in an atmosphere of argon as above indicated and a bridge resistance of 30 ohms, the power required to raise the resistance of the wire from 6 to 30 ohms will be of the order of ¾ watts, the entire bridge drawing about 3 watts. For a direct current bridge, a 9 volt battery may be used. Under the foregoing conditions, the wire will experience a 3.0% change in resistance when moved from a vertical to a horizontal position, and, with an acceleration of 100×g. or 100 times the acceleration due to gravity, the resistance thereof will change approximately 11.5%. In terms of meter reading, under the above conditions and assuming the bridge is balanced when the wire is vertical, inclination of the wire at an angle of 45° to vertical will produce an output or meter reading of 200 microamperes. Under an acceleration of the magnitude of 20×g. at right angles to the wire length, an output of one milliampere is obtained. Furthermore, the above accelerometer has an exceedingly short period of response or reaction time, being of the order of $1/1000$ sec. and less.

I also propose to employ a mixture of gases within the envelope of my acceleration-sensitive element. Hydrogen, for example, does not exhibit any appreciable inertia and does not appreciably change the resistance of the resistor, at least without very high amplification, when subjected to ordinary acceleration forces. However, hydrogen does have excellent heat conductivity properties, and a mixture of hydrogen or suitable gas having similar desirable properties, with a gas of relatively high molecular weight will be endowed both with the high inertia properties of the relatively heavy gas and the good heat conductivity properties of hydrogen. The sensitivity of the accelerometer or the percent change in resistance of the resistor when subjected to a given acceleration will increase with the molecular weight and heat conductivity of the gas and, therefore, a choice of gases is available which may be combined in a manner most favorable for operation with any prescribed range of acceleration forces.

Tests have shown that, with all other factors constant and using xenon, for example, only within the envelope, the sensitivity of my accelerometer or the magnitude of the output thereof for a given acceleration was approximately twice as great as that when krypton, for example, was used, and krypton provided a similar increase in sensitivity over a unit containing argon. Also a mixture of xenon and hydrogen provided greater sensitivity than with xenon alone even with a ratio of about 1 part xenon and 2 parts hydrogen.

Additionally, it is to be noted that the resistance element may be operated at temperatures sufficient to produce dissociation of the hydrogen gas and, under such conditions, the thermal conductivity properties of the hydrogen gas will be extremely good. Furthermore, it is advantageous to use gases under relatively high pressures in order to increase the sensitivity of the device or the magnitude of the change in resistance of the element and thereby the magnitude of the output for a given acceleration.

Other gases than those above referred to and other resistance elements may be employed provided the gases primarily exhibit sufficient inertia as to produce appreciable changes in the resistance of the resistance elements while at the same time being relatively chemically inactive with respect to the resistor so as not to attack or effect appreciably rapid reduction thereof.

While in the foregoing, I have represented and described a D. C. bridge, it will be understood that an alternating current source may be connected to the bridge and a suitable amplifier and indicating device may be employed to measure or provide an indication of bridge unbalance.

Additionally, it will be understood that any desired number or plurality of the acceleration-sensitive elements of my invention each of which may comprise one or more resistance elements therein may be so relatively arranged and operatively connected in a suitable balancing circuit as cooperatively to eliminate or appreciably diminish the response of the unit so formed to undesired acceleration components while providing an indication of magnitude or magnitude and direction of those accelerations, the detection and measurement of which is desired.

Furthermore, it should be appreciated that my invention may be employed, in general, as a vertical indicator or reference, or, as a level indication or horizontal reference, and also to indicate or detect and measure angular as well as translation accelerations.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In an accelerometer, an acceleration-sensitive element for controlling the electrical output of said accelerometer, said element comprising a closed envelope containing therewithin spaced supports and an electrical resistance element having a high temperature coefficient of resistivity, said resistance element being fastened at opposite ends thereof in said spaced supports and extending crosswise of said envelope between said supports, said resistance being directly subjected substantially only to heat generated thereby and being adapted to be connected across a source of electrical energy, terminal means for establishing electrical connections to the ends of said resistance element, said resistance extending linearly of said envelope, and said envelope containing a gas exhibiting sufficient inertia appreciably to vary the resistance of said resistance element when subjected to acceleration forces, and the side walls of said envelope at least in part extending substantially parallel with said resistance element and lying in closely spaced relation thereto.

2. An electrical, acceleration-sensitive device comprising a closed envelope containing therewithin spaced supports and an electrical resistance element having a high temperature coefficient of resistivity, said element being fastened at opposite ends in said spaced supports and extending generally linearly within said envelope and crosswise thereof between said supports, said element being directly subjected substantially only to self-generated heat, said envelope being provided with means extending along opposite sides of said resistance and in closely spaced relation thereto for suppressing the response of said resistance element to components of accelerations occurring in planes including said means and resistance element, and said envelope containing a gas exhibiting sufficient inertia when subjected to acceleration forces as appreciably to vary the resistance of said resistance element.

3. An electrical, acceleration-sensitive device comprising a closed envelope containing therewithin spaced supports and an electrical resistance element having a high temperature coefficient of resistivity, said element being fastened at opposite ends in said spaced supports and extending generally linearly within said envelope and crosswise thereof between said supports, said element being directly subjected substantially only to self-generated heat, and a pair of baffles disposed within said envelope and extending respectively along opposite sides of said resistance element and in closely spaced relation thereto for suppressing the response of said resistance to components of accelerations occurring in planes including said baffles and resistance element, and said enevelope containing a gas exhibiting sufficient inertia as appreciably to vary the resistance of said resistance element when subjected to acceleration forces.

4. In an acceleration-sensitive instrument adapted to provide an electrical signal output in accordance with acceleration forces to which it is subjected, an acceleration-sensitive element comprising a closed envelope containing a fluid, an extremely fine electrical resistance element supported within said envelope and wholly immersed in said fluid and directly subjected only to self-generated heat, said resistance element being adapted for energization from a source of electrical energy and said fluid exhibiting sufficient inertia under external acceleration forces as to affect the resistance of said resistance element, and the size of the resistance element and the nature and amount of fluid within the envelope being so selected that movement of the fluid within the envelope caused solely by convection due to heat of the resistance element and by the effect of external forces on the mass of the fluid results in measurable changes in the resistance of the resistance element.

5. In an acceleration-sensitive instrument adapted to provide an electrical signal output in accordance with acceleration forces to which it is subjected, an acceleration-sensitive element comprising a closed envelope containing a gas, an extremely fine electrical resistance element supported within said envelope and directly subjected only to self-generated heat, said resistance element being adapted for energization from a source of electrical energy and said gas exhibiting sufficient inertia under external acceleration forces as to affect the resistance of said resistance element, and the size of the resistance element, and the nature and amount of gas within the envelope being so selected that movement of the gas within the envelope caused solely by convection due to heat of the resistance element and by the effect of external forces on the mass of the gas results in measurable changes in the resistance of the resistance element.

6. In an acceleration-sensitive instrument adapted to provide an electrical signal output in accordance with acceleration forces to which it is subjected, an acceleration-sensitive element comprising a gas-filled, closed envelope, an extremely fine electrical resistance element therein adapted to be connected across a source of electrical energy, and said envelope containing one of the elements taken from the group consisting of nitrogen, helium, neon, argon, krypton and xenon, and the size of the resistance element and the nature and amount of gas within the envelope being so selected that movement of the gas within the envelope caused solely by convection due to heat of the resistance element and by the effect of external forces on the mass of the gas results in measurable changes in the resistance of the resistance element.

7. In an acceleration-sensitive instrument adapted to provide an electrical signal output in accordance with acceleration forces to which it is subjected, an acceleration-sensitive element comprising a gas-filled, closed envelope, an extremely fine electrical resistance element therein adapted to be connected across a source of electrical energy, said envelope containing a plurality of elements taken from the group consisting of nitrogen, helium, neon, argon, krypton and xenon, and the size of the resistance element and the nature and amount of gas within the envelope being so selected that movement of the gas within the envelope caused solely by convection due to heat of the resistance element and by the effect of external forces on the mass of the gas results in measurable changes in the resistance of the resistance element.

8. In an acceleration-sensitive instrument adapted to provide an electrical signal output in accordance with acceleration forces to which it is subjected, an acceleration-sensitive element comprising a closed envelope, an extremely fine electrical resistance element therein adapted to be energized from a source of electrical energy, said envelope containing a heat-conducting gas and a gas having sufficiently high inertia as appreciably to vary the resistance of said resistance element when subjected to acceleration forces, and the size of the resistance element and the nature and amount of gas within the envelope being so selected that movement of the gas within the envelope caused solely by convection due to heat of the resistance element and by the effect of external forces on the mass of the gas results in measurable changes in the resistance of the resistance element.

9. In an acceleration-sensitive instrument adapted to provide an electrical signal output in accordance with acceleration forces to which it is subjected, an acceleration-sensitive element comprising a closed envelope, an extremely fine electrical resistance element therein adapted to be energized from a source of electrical energy, said envelope containing a heat-conducting gas and a gas taken from the group consisting of nitrogen, helium, neon, argon, krypton and xenon, and the size of the resistance element and the nature and amount of gas within the envelope being so selected that movement of the gas within the envelope caused solely by convection due to heat of the resistance element and by the effect of external forces on the mass of the gas results in measurable changes in the resistance of the resistance element.

10. In an acceleration-sensitive instrument adapted to provide an electrical signal output in accordance with acceleration forces to which it is subjected, an acceleration-sensitive element comprising a closed envelope, an extremely fine electrical resistance element therein having a high temperature coefficient of resistivity and being adapted to be connected across a source of electrical energy, said envelope containing hydrogen and a gas having sufficiently high inertia as appreciably to vary the resistance of said resistance element when subjected to acceleration forces, and the size of the resistance element and the nature and amount of gas within the envelope being so selected that movement of the gas within the envelope caused solely by convection due to heat of the resistance element and by the effect of external forces on the mass of the gas results in measurable changes in the resistance of the resistance element.

11. In an acceleration-sensitive instrument adapted to provide an electrical signal output in accordance with acceleration forces to which it is subjected, an acceleration-sensitive element comprising a closed envelope, an electrical resistance element therein adapted to be connected across a source of electrical energy, said envelope containing hydrogen and a gas taken from the group consisting of nitrogen, helium, neon, argon, krypton, and xenon, and the size of the resistance element and the nature and amount of gas within the envelope being so selected that movement of the gas within the envelope caused solely by convection due to heat of the resistance element and by the effect of external forces on the mass of the gas results in measurable changes in the resistance of the resistance element.

12. In an acceleration-sensitive instrument adapted to provide an electrical signal output in accordance with acceleration forces to which it is subjected, an acceleration-sensitive device comprising a closed envelope containing a fluid, an extremely fine electrical resistance element supported within said envelope and wholly immersed in the fluid, said resistance element being mounted to provide relatively angularly disposed portions adapted for energization from a source of electrical energy, said fluid exhibiting sufficient inertia under external acceleration forces as to affect the resistance of said resistance element, and the size of the resistance element and the nature and amount of fluid within the envelope being so selected that movement of the fluid within the envelope caused solely by convection due to heat of the resistance element and by the effect of external forces on the mass of the fluid results in measurable changes in the resistance of the resistance element.

13. In an acceleration-sensitive instrument adapted to provide an electrical signal output in accordance with acceleration forces to which it is subjected, an acceleration-sensitive device comprising a closed envelope containing a fluid, an extremely fine electrical resistance element supported within said envelope and wholly immersed in the fluid, said resistance element being mounted to provide relatively angularly disposed portions forming a V and each of said portions being directly subjected only to self-generated heat, a plurality of leads adapted to be connected to a source of electrical energy and including a pair of leads connecting respectively with the ends of said resistance element and a third lead connecting with the resistance element at the apex of the V formed thereby, said fluid exhibiting sufficient inertia under external acceleration forces as to affect the resistance of said resistance element, and the size of the resistance element and the nature and amount of fluid within the envelope being so selected that movement of the fluid within the envelope caused solely by convection due to heat of the resistance element and by the effect of external forces on the mass of the fluid results in measurable changes in the resistance of the resistance element.

14. In an acceleration-sensitive instrument adapted to provide an electrical signal output in accordance with acceleration forces to which it is subjected, an acceleration-sensitive device comprising a closed envelope containing a gas, an extremely fine electrical resistance element therein adapted to be energized from a source of electrical energy and having portions thereof disposed in relative angular relationship to form a V, a plurality of leads adapted to be connected to a source of electrical energy and including a pair of leads connecting respectively with the ends of said resistance element and a third lead connecting with the resistance element at the apex of the V formed thereby, said gas exhibiting sufficient inertia under external acceleration forces as to affect the resistance of said resistance element, and the size of the resistance element and the nature and amount of gas within the envelope being so selected that movement of the gas within the envelope caused solely by convection due to heat of the resistance element and by the effect of external forces on the mass of the gas results in measurable changes in the resistance of the resistance element.

15. In an acceleration-sensitive instrument adapted to provide an electrical signal output in accordance with acceleration forces to which it is subjected, an acceleration-sensitive device comprising a closed envelope, an extremely fine electrical resistance element therein adapted to be energized from a source of electrical energy and having portions thereof disposed in relative angular relationship, said envelope containing one of the elements taken from the group consisting of nitrogen, helium, neon, argon, krypton and xenon, and the size of the resistance element and the nature and amount of gas within the envelope being so selected that movement of the gas within the envelope caused solely by convection due to heat of the resistance element and by the effect of external forces on the mass of the gas results in measurable changes in the resistance of the resistance element.

16. In an acceleration-sensitive instrument adapted to provide an electrical signal output in accordance with acceleration forces to which it is subjected, an acceleration-sensitive device comprising a closed envelope, extremely fine electrical resistance elements relatively arranged to form a V within said envelope, said elements having a high temperature coefficient of resistivity, a plurality of leads adapted to be connected to a source of electrical energy and including a pair of leads connecting respectively with the ends of said resistance elements and a third lead connecting with the resistance elements at the apex of the V formed thereby, said envelope containing an element taken from the group consisting of nitrogen, helium, neon, argon, krypton and xenon, and the size of the resistance elements and the nature and amount of gas within the envelope being so selected that movement of the gas within the envelope caused solely by convection due to heat of the resistance elements and by the effect of external forces on the mass of the gas results in measurable changes in the resistance of the resistance elements.

HUGH E. WEBBER.

REFERENCES CITED

The following references are of record in the file of this patent:

UNITED STATES PATENTS

| Number | Name | Date |
|---|---|---|
| 1,266,570 | Farnsworth | May 21, 1918 |
| 1,317,072 | Carlier | Sept. 23, 1919 |
| 1,651,387 | Gustin | Dec. 6, 1927 |
| 1,832,334 | Tarbox | Nov. 17, 1931 |
| 1,841,607 | Kollsman | Jan. 19, 1932 |
| 2,023,748 | Shipley | Dec. 10, 1935 |
| 2,193,910 | Wilson | Mar. 19, 1940 |
| 2,203,897 | De Graaff | June 11, 1940 |
| 2,233,844 | Mellin | Mar. 4, 1941 |

FOREIGN PATENTS

| Number | Country | Date |
|---|---|---|
| 425,059 | Germany | Feb. 6, 1926 |